United States Patent
Maki et al.

(10) Patent No.: US 6,508,329 B2
(45) Date of Patent: Jan. 21, 2003

(54) MOUNTING STRUCTURE OF EXHAUST PIPE SYSTEM IN VEHICLE

(75) Inventors: Yuji Maki, Saitama (JP); Yasuhiro Matsumoto, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/821,073

(22) Filed: Mar. 30, 2001

(65) Prior Publication Data

US 2001/0045314 A1 Nov. 29, 2001

(30) Foreign Application Priority Data

Mar. 30, 2000 (JP) ........................................ 2000-093783

(51) Int. Cl.[7] .............................................. B60K 13/04
(52) U.S. Cl. ...................... 180/309; 180/89.2; 248/62
(58) Field of Search .................. 180/309, 296, 180/225, 89.2; 248/62

(56) References Cited

U.S. PATENT DOCUMENTS 4,623,167 A * 11/1986 Matsubayashi et al. ..... 280/798
5,127,489 A * 7/1992 Takato et al. ................ 180/309
5,823,286 A * 10/1998 Ishihara et al. ............. 180/309
6,378,645 B1 * 4/2002 Uegane et al. .............. 180/309

FOREIGN PATENT DOCUMENTS

| JP | H133778 | | 10/1989 |
| JP | 354090 | * | 3/1991 |
| JP | 382690 | * | 4/1991 |
| JP | 3136993 | * | 6/1991 |
| JP | 411593 | * | 1/1992 |

* cited by examiner

Primary Examiner—Brian L. Johnson
Assistant Examiner—Bryan Fischmann
(74) Attorney, Agent, or Firm—Birch, Stewart, Kolasch & Birch LLP

(57) ABSTRACT

A mounting structure of an exhaust pipe system in a vehicle capable of making a magnitude of a moment acting on the exhaust pipe system as small as possible by means of a simple constitution. In a mounting structure of an exhaust pipe system in a vehicle the exhaust pipe system is connected to an engine loaded onto the vehicle and for guiding exhaust gas discharged from the engine to the ambient air, on a vehicle body frame constituting the vehicle, wherein the exhaust pipe system is constituted so as to be connected to the vehicle body frame in a position substantially upwardly from a position G of the center of gravity of the exhaust pipe system.

6 Claims, 3 Drawing Sheets

MOUNTING STRUCTURE OF EXHAUST PIPE SYSTEM IN VEHICLE

BACKGROUND OF THE INVENTION

1. Field of the Invention

The present invention relates to a mounting structure of an exhaust pipe system for a vehicle.

2. Description of Background Art

Conventionally, for example, in a vehicle such as a saddle-type vehicle, as disclosed in Japanese Examined Utility Model Publication H1-33778, the vehicle is provided with an engine loaded onto a vehicle body frame and an exhaust pipe system for emitting exhaust gas discharged from the engine to the atmosphere. The exhaust pipe system extends rearwardly along a side portion of a vehicle body from the engine, and is suspended to a rearward side portion of the vehicle body frame.

A problem exists with the mounting structure of a conventional exhaust pipe system in that a moment is generated around a suspended position of the exhaust pipe system due to vibration or the like which occurs during the operation of the vehicle.

When a moment like this is generated, in particular, since a muffler constituting the exhaust system is a heavy article, a large load operates on a connecting portion of the exhaust pipe system with an engine.

Thus, in the prior art described above, in order to decrease the load operating on the connecting portion, such a measure is taken such that a shock absorbing body formed out of an elastic material, such as rubber, is mounted on the connecting portion described above.

However, in such a method as coping with the problem described above, not only the shock absorbing body stated above, but also various components are necessitated for mounting the shock absorbing body. Thereby, the number of parts of the exhaust pipe system are increased, so that weight of the vehicle is increased or a sharp rise in cost occurs.

SUMMARY AND OBJECTS OF THE INVENTION

The present invention overcomes the above conventional problems. It is an object of the invention is to provide a mounting structure of an exhaust pipe system in a vehicle that is capable of making the magnitude of a moment operating on the exhaust system as small as possible by means of a simple constitution.

To achieve the object described above, in a first aspect of the invention, a mounting structure for an exhaust pipe system in a vehicle, in which the exhaust pipe system is connected to an engine loaded onto the vehicle and for guiding exhaust gas discharged from the engine to outside air is mounted on a vehicle body frame constituting the vehicle. The exhaust pipe system is connected to the vehicle body frame in a position substantially upwardly from a center of gravity of the exhaust pipe system.

In a second aspect of the invention, a mounting structure of an exhaust pipe system in a vehicle according to the first aspect includes the exhaust pipe system having an exhaust pipe connected to the engine and a muffler integrally formed with the exhaust pipe. The exhaust pipe system is connected to the vehicle body frame in the position substantially upwardly from the center of gravity of the exhaust pipe system including the exhaust pipe and the muffler.

In a third aspect of the invention, a mounting structure of an exhaust pipe system in a vehicle according the first aspect includes the exhaust pipe system having an exhaust pipe connected to the engine and a muffler connected to the exhaust pipe, and the muffler is connected to the vehicle body frame in the position substantially upwardly from the center of gravity of the muffler.

In a fourth aspect of the invention, a mounting structure of an exhaust pipe system in a vehicle according to the first to third aspects includes the exhaust pipe system connected to the vehicle body frame, in such a manner that a bracket is provided at a position mounted with the exhaust pipe system on the vehicle body frame. A stay is provided on the vehicle body frame that is connected and opposed to the bracket from a side portion of the vehicle body frame. The bracket is connected with the stay via a shock absorbing member. The shock absorbing member includes a shock absorbing disk interposed between the bracket and the stay, and a shock absorbing cylinder inserted through the bracket to be brought into contact with the shock absorbing disk. The shock absorbing cylinder is provided with an annular outward flange to be brought into contact with the bracket in a side opposed to the stay. The stay and the bracket are jointly fastened by means of a fastening member provided by projecting through the shock absorbing disk and shock absorbing cylinder.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
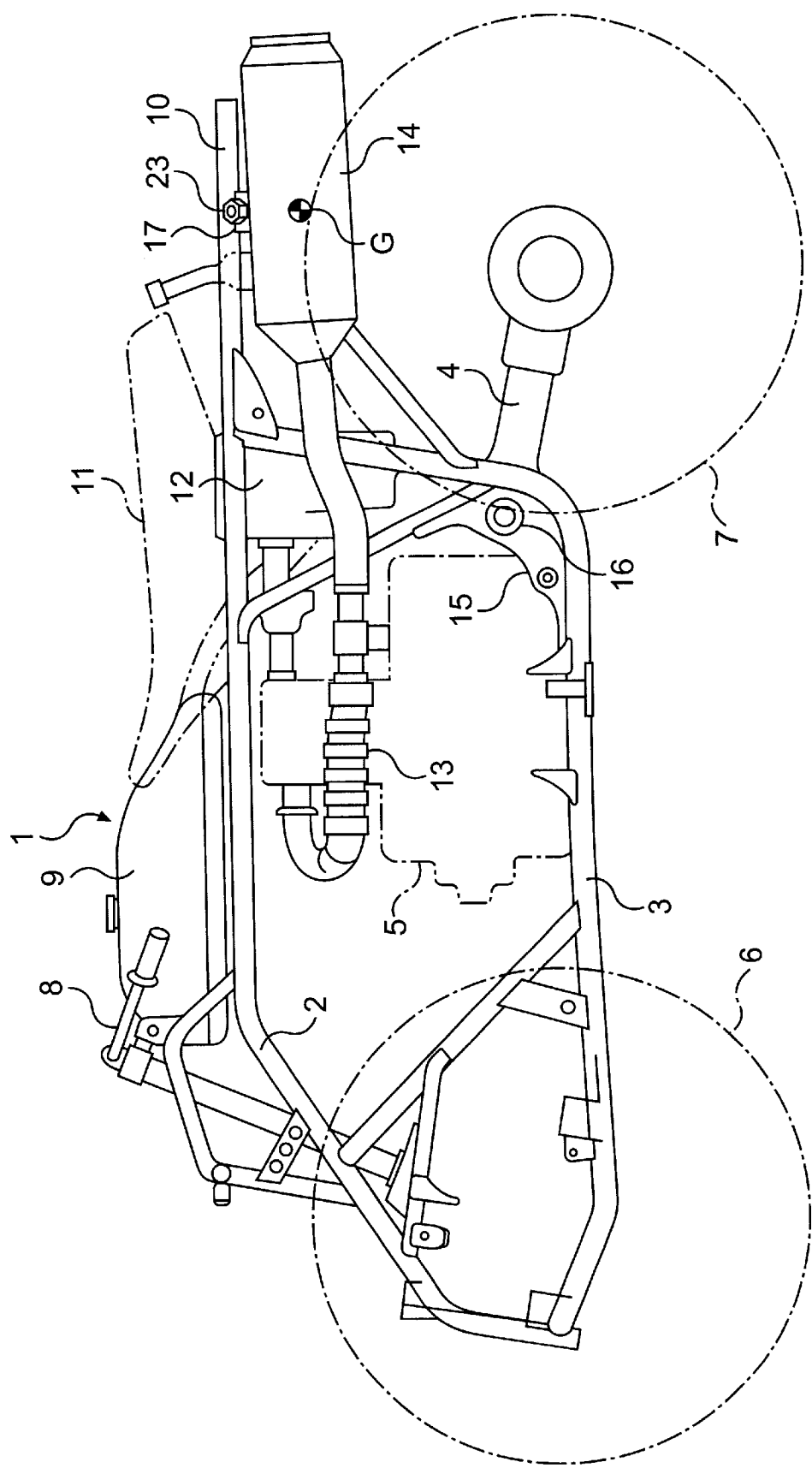
FIG. 1 shows a schematic side elevational view illustrating a saddle-type vehicle of an embodiment of the present invention.

Hereinafter, an embodiment of the present invention will be described with reference to the drawings. In FIG. 1, a saddle-type vehicle 1 is a vehicle applied to the present embodiment.

The saddle-type vehicle 1 is provided with a pair of left and right main pipes 2 constituting an upper portion of a vehicle body portion. A pair of left and right under pipes 3 arranged along downwardly from the main pipes 2 and connected to the main pipes 2 in a forward side. A rear fork 4 is vertically and rockably mounted on the under pipes 3 on a rearward side thereof. An engine 5 is arranged at a spatial portion formed by the main pipes 2 and the under pipes 3. Further, fixed to the under pipe 3, a pair of left and right front wheels 6 are vertically and movably mounted on left and right front portions of the main pipes 2 and the under pipes 3. A pair of rear wheels 7 are mounted on left and right sides of the rear fork 4.

Further, a steering handlebar 8 provides for the steering of the front wheels 6 at a front portion of the main pipes 2. A fuel tank 9 is provided rearwardly of the steering handlebar 8.

In addition, a seat 11 is supported by means of seat pipes 10 extending and being provided towards the rearward of the main pipes 2 to the rear of the fuel tank 9. An air cleaner 12 is provided for cleaning up combustion air supplied to the engine 5 downward of the seat 11.

Further, an exhausted pipe system is provided for emitting combustion gas to outside air, and for restraining exhaust noise from the engine 5. The exhausted pipe system includes an exhaust pipe 13 connected to the engine 5 and a muffler 14 continuously provided at the end portion downstream of the exhaust pipe 13.

On the other hand, the rear fork 4 is provided vertically and rockably supported by means of a bearing 16 mounted on a pivot plate 15 at a rear portion of the under pipes 3.

Further, in the present embodiment, the muffler 14 is connected in the tip portion thereof at a rear end portion of the exhaust pipe 13 via a coupling member 30.

Further, the muffler 14 is provided with a bracket 17 in a position upwardly from a position G of the center of gravity thereof. A stay 18 (refer to FIG. 4) is provided in a rearward side portion of the seat pipe 10, as the bracket 17 is connected to the stay 18, so that the muffler 14 is suspended from the seat pipe 10.

Figure 4:
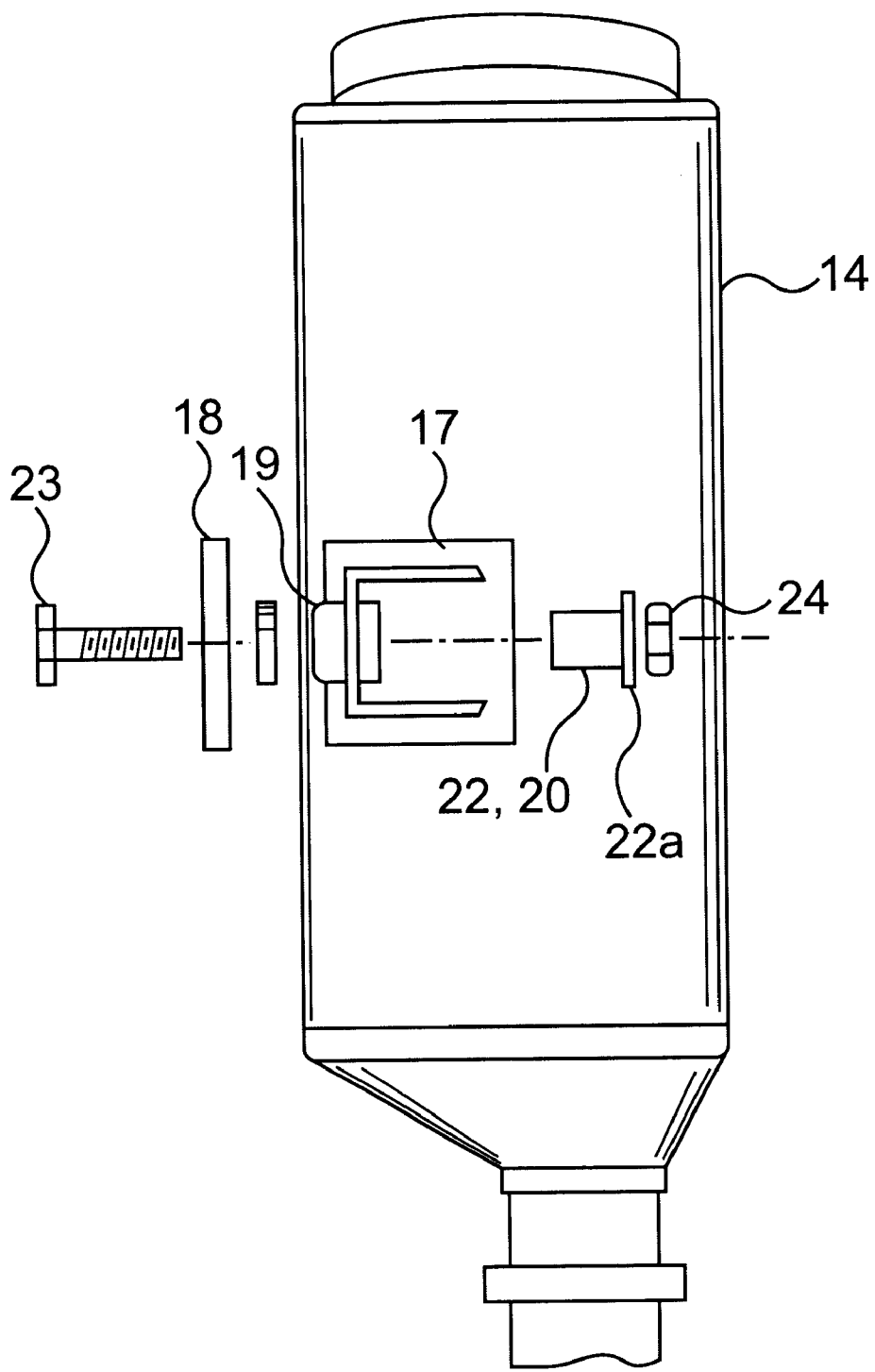
FIG. 4 shows an exploded plan view for explaining a suspension structure of a muffler in illustrating an embodiment of the present invention.

In describing in further detail, the bracket 17, as illustrated in FIG. 4, is formed substantially in a shape of U and, as described above, is integrally mounted on the muffler 14 in a position upwardly from the position G of the center of gravity thereof by means of welding or the like.

Further, a collar 19 is integrally mounted on the bracket 17 along a direction that is across at right angle with an axial direction of the muffler 14, the collar 19 is mounted with a shock absorbing member 20 interposed between the stay 18 and the bracket 17.

The shock absorbing member 20 includes an annular shock absorbing disk 21 having an outer diameter larger than an outer diameter of the collar 19 and interposed between the collar 19 and the stay 18, and a shock absorbing cylinder 22 which is inserted through the collar 19 and is brought into contact with the shock absorbing disk 21. The shock absorbing cylinder 22 is provided with and annular outward flange portion 22*a* placed in contact with the collar 19 on the side opposed to the stay 18.

Further, the shock absorbing disk 21 is arranged between the stay 18 and the collar 19, the shock absorbing cylinder 22 is inserted into the collar 19, the outward flange 22*a* of the shock absorbing cylinder 22 is brought into contact with the end face of the collar 19, a fastening member composed of a bolt 23 and a nut 24 is pierced through the stay 18, the shock absorbing disk 21, and shock absorbing cylinder 22, so that the muffler 14 is connected to the seat pipe 10 by jointly fastening the elements.

In the exhaust pipe system mounted in this manner, in association with the operation of the saddle-type vehicle 1, vibration is generated.

Figure 3:
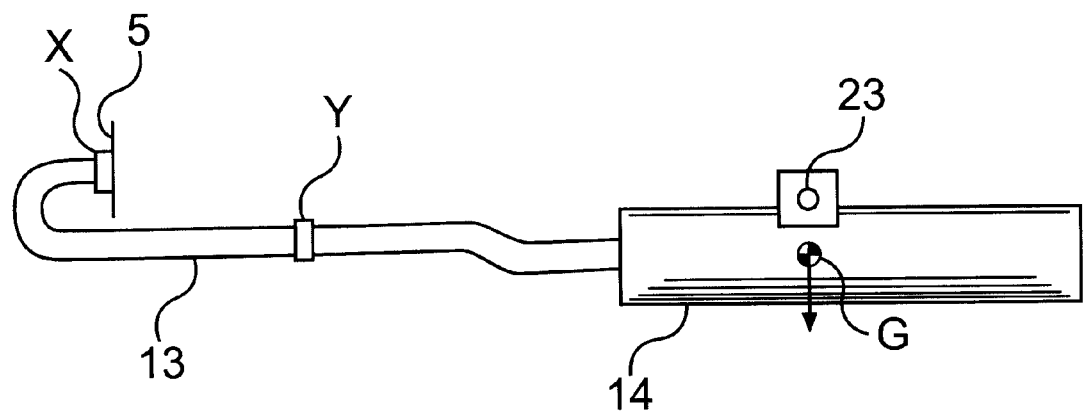
FIG. 3 shows a schematic side elevational view illustrating a generating state of a load when vibrating in an embodiment of the present invention.

However, as described above, since the muffler 14 is installed on the seat pipe 10 in a position upwardly from the position G of the center of gravity thereof, as illustrated by an arrow in FIG. 3, a load which acts on the muffler 14 directly acts beneath with respect to the fastening member 23, 24.

As a result, generation of a moment around the fastening member 23, 24 is restrained.

Accordingly, excessive force is prevented from acting on a connection portion X of the exhaust pipe 13 with the engine 5, and a connection portion Y of the exhaust pipe 13 with the muffler 14.

Figure 2:
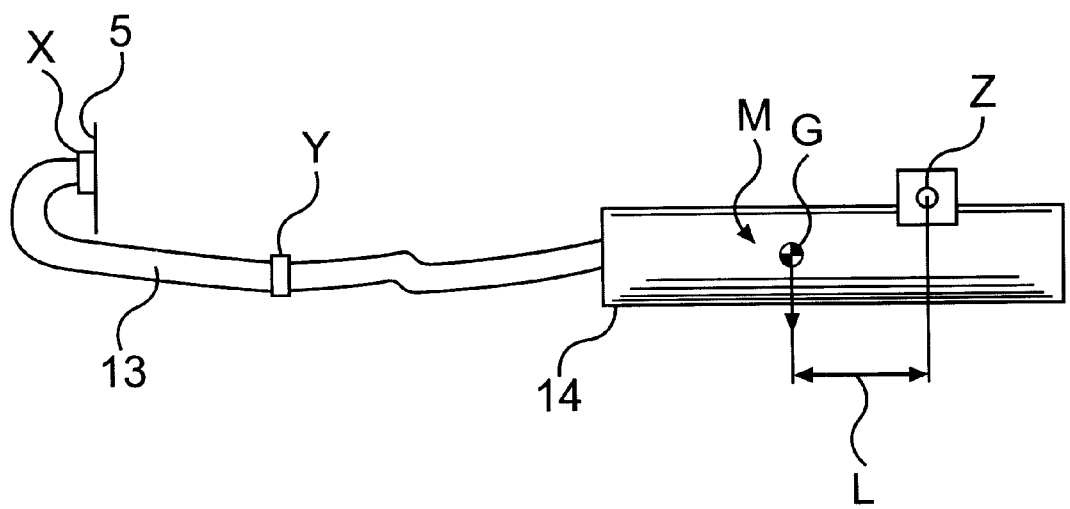
FIG. 2 shows a schematic side elevational view illustrating a generating state of a load when vibrating in a mounting structure of a conventional exhaust pipe system.

Here, in comparison with the conventional art, in the conventional method, as illustrated in FIG. 2, caused by a displacement distance L between a position Z of suspension and the position G of the center of gravity of the muffler 14, a moment M is generated around the position Z of the suspension, thereby, the excessive force acts on the connection portion X of the exhaust pipe 13 with the engine 5 and the connection portion Y of the exhaust pipe 13 with the muffler 14.

According to the present embodiments, without taking measures such as reinforcement of the connection portion X of the exhaust pipe 13 with the engine 5 and the connection portion Y of the exhaust pipe 13 with the muffler 14 and the installation of the shock absorbing member, an increase in excessive support members is prevented from occurring and a sharp rise in cost can be restrained.

In the meantime, various shapes or dimensions of respective support members shown in the embodiment described above are just one example, and they are variously changeable according to the requirements in design or the like.

For example, in the embodiment described above, it exemplifies a case where the exhaust pipe 13 and the muffler 14 constituting the exhaust pipe system are connected with each other at their respective end portions. However, in a case where it is in such a construction wherein they are integrally formed with each other, since the position of the center of gravity as a whole exhaust pipe system is moved to a side of the engine, to that amount, the installation position of the muffler is necessitated to be moved to the side of the engine.

Further, the saddle-type vehicle is illustrated as a vehicle, however, the constitution can be applicable to the other kinds of vehicles such as a motorcycle.

As explained above, according to a mounting structure of an exhaust pipe system in a vehicle of the present invention, in a case where vibration is applied to the exhaust pipe system, durability of the exhaust pipe system can be improved by restraining the generation of a moment around a suspension position of the exhaust pipe system, and an additional measure for a shock absorbing function with respect to various connecting portions of the exhaust pipe system can be eliminated.

Further, since an operating direction of a load in a suspension position can only be bought together in a vertical direction, in a state where a shock absorbing member is arranged in the suspension position, a direction of the load operating relative to the shock absorbing member constitutes one direction. Therefore, improvement in the durability of the shock absorbing member can also be realized.

Accordingly, an increase in weight of a vehicle can be restrained, and a sharp rise in cost can also be restrained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A mounting structure for an exhaust pipe system connected to an engine for guiding exhaust gas discharged from the engine to the ambient air comprising:

a vehicle body frame;

a bracket for mounting the exhaust pipe system on the vehicle body frame;

a stay for connecting and being opposed to the bracket from a side portion of the vehicle body frame;

a shock absorbing member for connecting said bracket to the stay; said shock absorbing member including a shock absorbing disk interposed between the bracket and the stay and a shock absorbing cylinder inserted through the bracket to be brought into contact with the shock absorbing disk, said shock absorbing cylinder having an annular outward flange to be brought into contact with the bracket in a side opposed to the stay; and a fastening member for connecting said shock absorbing member, the stay and the bracket by inserting the fastening member through the shock absorbing disk and shock absorbing cylinder, said exhaust pipe system being connected to the vehicle body frame at a point substantially upwardly from a center of gravity of the exhaust pipe system.

2. The mounting structure of an exhaust pipe system according to claim 1, wherein the exhaust pipe system includes an exhaust pipe connected to the engine and a muffler integrally formed with the exhaust pipe, and the exhaust pipe system is connected to the vehicle body frame at the point substantially upwardly from the center of gravity of the exhaust pipe system including the exhaust pipe and the muffler.

3. The mounting structure of an exhaust pipe system according to claim 1, wherein the exhaust pipe system includes an exhaust pipe connected to the engine and a muffler connected to the exhaust pipe, and the muffler is connected to the vehicle body frame at the point substantially upwardly from the center of gravity of the muffler.

4. A mounting bracket for an exhaust pipe system comprising:

a bracket for mounting the exhaust pipe system on a vehicle body frame;

a stay for connecting and being opposed to the bracket from a side portion of the vehicle body frame;

a shock absorbing member for connecting said bracket to the stay; said shock absorbing member including a shock absorbing disk interposed between the bracket and the stay and a shock absorbing cylinder inserted through the bracket to be brought into contact with the shock absorbing disk, said shock absorbing cylinder having an annular outward flange to be brought into contact with the bracket in a side opposed to the stay; and a fastening member for connecting said shock absorbing member, the stay and the bracket by inserting the fastening member through the shock absorbing disk and shock absorbing cylinder, said exhaust pipe system including a center of gravity; and said bracket being connected to the exhaust pipe system substantially above the center of gravity and being connected to the vehicle body frame.

5. The mounting bracket for an exhaust pipe system according to claim 4, wherein the exhaust pipe system includes an exhaust pipe connected to an engine and a muffler integrally formed with the exhaust pipe, and the exhaust pipe system is connected to the vehicle body frame by the bracket substantially upwardly from the center of gravity of a the exhaust pipe system including the exhaust pipe and the muffler.

6. The mounting bracket for an exhaust pipe system according to claim 4, wherein the exhaust pipe system includes an exhaust pipe connected to an engine and a muffler connected to the exhaust pipe, and the muffler is connected to the vehicle body frame by the bracket substantially upwardly from the center of gravity of the muffler.

* * * * *